3,140,266
PROCESS FOR FOAMING SYNTHETIC POLYMERS
Warner L. Peticolas, San Jose, Calif., assignor, by mesne assignments, to Minnesota Mining and Manufacturing Company, St. Paul, Minn., a corporation of Delaware
No Drawing. Filed Dec. 30, 1960, Ser. No. 79,494
13 Claims. (Cl. 260—2.5)

My invention relates to plastic foams, and more particularly, to a process for the preparation of foamed synthetic polymeric substances at temperatures below the melting point of the polymer being foamed.

Foamed polymers are used for decorative purposes, furniture and bedding cushioning, heat and electrical insulating materials, in vesicular image photography, and in letterpress printing makeready.

These known foams are prepared by several processes. Blowing agents which decompose under particular conditions are incorporated in the polymers and are decomposed to form the desired foam. Alternately, a gas is blown into the molten polymer under pressure and the polymer is solidified before the gas bubbles can escape from the plastic.

Foamed polymers prepared by previous processes have extremely poor structural strength, and, as a result, have only limited utility.

I have now discovered a process wherein the degree of blow is critically controlled and high strength foams can be obtained in addition to the low strength foams previously known. My new high strength polymers are apparently biaxially oriented, a fact which may account for their unusual strength and flexibility.

Essentially, my process comprises dissolving a supersaturating amount of a gas in a polymer and adjusting the internal gas pressure relative to the external gas pressure so as to establish a pressure differential sufficient to cause expansion of the gas within the polymer, thereby foaming the polymer.

By the terms "supersaturate" and "supersaturating amount" I mean to use them as they are normally understood. That is, these terms denote that sufficient gas is forced into the polymer so that when the external pressure and/or temperature is lowered, the polymer contains an amount of gas in excess of the amount which would normally saturate the polymer at lower external pressures and/or temperatures.

Suitable gases for use in my process are nonreactive with a polymer to be foamed at temperatures utilized in the foaming process. These gases include nitrogen, the noble gases, such as argon and neon, carbon dioxide, carbon monoxide, krypton, mixtures of the above, for example, air; and the Freons, i.e., low molecular weight polyfluoro and polyfluorochloro and bromo compounds. I prefer to utilize nitrogen, argon, carbon dioxide and Freons as the blowing gases.

Polymers which can be foamed by my process are sufficiently flexible at blowing temperatures to blow without shattering the polymer into comminuted particles or loosely joined fragments. The diffusion rate of the blowing gas through the polymer should be low, i.e., the gas should diffuse slowly through the polymer. Such polymers include polycarbonates, polyvinyl chloride, polyvinylidene chloride, copolymers of these halopolymers, polyamides, such as nylon, polyesters such as polyethylene glycol terephthalate, polymethyl α-chloro acrylate, polystyrene, acrylonitrile, polymethyl methacrylate, and cellulosic polymers such as nitro cellulose, ethyl cellulose, etc. Other polymers which can be used in my process include the acetal polymers and fluoro and fluorochloro polymers such as polytetrafluoroethylene, polychlorotrifluoroethylene and polyvinylfluoride.

The inert gases are introduced into the polymer at elevated pressures. The particular pressure utilized will depend upon the desired saturation rate, the temperature of the polymer and the chemical composition of the polymer per se. Thus, a plastic can be supersaturated under 1000 p.s.i. at temperatures above the melting point of the polymer much faster than it can be supersaturated at room temperature and 500 p.s.i. gas pressure. Gas pressures of from about 8 to in excess of 1000 atmospheres are operative in my process but I prefer to utilize pressures in excess of about 30 atmospheres.

The polymers are supersaturated at any desired temperature below the decomposition temperature of the polymer. Formed articles are preferably supersaturated at temperatures below the softening point of the polymer so as to maintain the desired form. On the other hand, unshaped articles are preferably supersaturated at temperatures in excess of the polymer melting point.

The supersaturated polymer can be foamed in a number of ways. For example, a high vacuum can be utilized to form foams at temperatures below the melting point of the polymer. The supersaturating gas pressure can be removed at room temperature and the polymer quickly heated in an inert fluid bath to a temperature at which the polymer foams, usually at temperatures below 200° C. and preferably below 100° C.; depending, of course, on the internal supersaturation pressure and the polymer. The polymer can be supersaturated to such an extent that it foams at room temperature and pressure. Alternately, where the polymer was molten when supersaturated, the polymer is cooled to a temperature below its melting point and the pressure is released to foam the plastic. The degree of foaming depends, in part, on the degree of supersaturation, i.e., greater amounts of foaming occur with greater supersaturation of the polymer.

In my preferred process, the polymer is supersaturated with an inert gas at temperatures in excess of the melting point of the polymer and foamed at temperatures below the melting point of the polymer. Still more preferable, the foamed polymer is formed at temperatures below the softening point of the polymer.

Generally, the supersaturating gas remains in the polymer a period of time ranging from a few minutes to a few days at ambient room temperatures and pressures, the period depending primarily on the diffusion rate of the supersaturating gas through the polymer. If supersaturated polymeric films are to be utilized in vesicular image photography or in letterpress printing makeready, desired shelflife can be obtained by maintaining the films under pressure in suitable containers.

It is apparent from the examples given that many different gases and polymer compositions can be used in my foaming process.

New resins and polymers are constantly being made commercially available, many of which undoubtedly will be found adaptable for use in my process. Therefore, it is impossible to attempt a comprehensive catalog of useful polymers and to attempt to apprehend or describe the invention in its broader aspects in terms of the chemical names of the myriad polymers and gas combinations which can be used in the process. The invention lies in the correlation of suitable gases and polymers and their individual composition is important only in the sense that the individual properties of the elements of any mechanical assemblage are important to their proper combination in coaction. To formulate a specific combination of gas and polymer for use in my process will call for chemical knowledge and skill, but the office of the chemist will be like that of the mechanical engineer who prescribes, in the construction of a machine, the proper materials and proper dimensions therefor. From his knowledge as a chemist, and the materials available, he will know or deduce with confidence the applicability to the purposes of the invention; or otherwise, in the case of novel materials, routine tests not of an inventive nature will provide reliable data. Thus, in many instances my process, while theoretically applicable, may not be practically useful because the polymers, temperatures, etc. involved would not be particularly advantageous. I assume that no one will wish to utilize my invention in such a useless process or will be misled because it is possible to misapply the teachings of the present disclosure in order to do so.

The following examples more fully illustrated my invention, but it is not intended that my invention be limited to the polymers, procedures, or gases disclosed therein. Rather, it is intended that all equivalents obvious to those skilled in the art be included within the scope of my invention as claimed.

*Example I*

A 3 mil. fix sheet of Saran (a polyvinylidene chloride acrylonitrile copolymer) was placed in a pressure bomb and subjected to 1700 p.s.i. $N_2$ pressure at 70–80° C. for 5 hours. The bomb was cooled to room temperature, vented and the film removed. At this time, the clear plastic film was heated to 70–80° C. to form an opaque, white foamed sheet. The softening point of Saran is about 140° C.

*Example II*

A Saran film was placed under 500 p.s.i. $CO_2$ pressure at 20–30° C. for 5 hours. When the bomb was vented to atmospheric pressure, the sheet foamed at room temperature. Again, a beautiful white foam having very small bubbles was formed.

*Example III*

A transparent 3 mil. Mylar (a polyethylene terephthalate polymer) sheet was subjected to less than 500 p.s.i. $CO_2$ pressure for 15–18 hours at room temperature. The bomb was vented and the film removed. The film was heated to 130° C. to produce a foamed white sheet 7 mil. thick. The melting point of Mylar is 240° C.

*Example IV*

The following table sets out various foaming process conditions found to be operative to produce excellent foamed plastics:

| Polymer | Gas | Bomb Temp., ° C. | Bomb Pressure, p.s.i. | Time in Bomb, Hrs. | Foaming Temp., °C. |
|---|---|---|---|---|---|
| Saran | Ar | 50 | 1500 | 5 | 130[2] |
| Saran | $CO_2$ | 30 | 500–900 | 5 | 75 |
| Saran | $CO_2$ | 95 | 500–600 | 0.25 | 90 |
| Saran/polymethylmethacrylate blend. | $N_2$ | | 2,500 | 0.25 | 80 |
| Lexan[1] | $CO_2$ | | 400 | Overnight | 104 |
| Teflon[3] | $CO_2$ | 50–60 | 650–700 | 40 | 250[2] |
| Kel-F[4] | $CO_2$ | 50–60 | 650–700 | 40 | 150[2] |
| Teflon[5] | $N_2$ | Room | 2,100 | 71 | 200[8] |
| Teflon[6] | $N_2$ | Room | 2,100 | 71 | 200[8] |
| Kel-F[5] | $N_2$ | Room | 2,100 | 71 | 200[8] |
| Kel-F[7] | $N_2$ | Room | 2,100 | 71 | 200[8] |
| Teflon[5] | Freon 13[9]. | Room | 450 | 90 | 170[2] |
| Kel-F[5] | Freon 13[9]. | Room | 450 | 90 | 170[2] |
| Kel-F[7] | $CO_2$ | 200 for 15 min. | 5,000 | Cooled over night under pressure. | Room temp. on release of pressure |
| Delrin[10] | $CO_2$ | 200 for 15 min. | 5,000 | Cooled over night under pressure. | Room temp. on release of pressure |

[1] Lexan is polycarbonate polymer of Bisphenol A (p,p'-isopropylidenediphenol) and $CO_2$.
[2] Foamed in a glycerol bath.
[3] Polytetrafluoroethylene.
[4] Polychlorotrifluoroethylene.
[5] ¼″ rod.
[6] 15 mil. sheet.
[7] 60 mil. sheet.
[8] In silicone bath.
[9] $CClF_3$.
[10] Polyformal.

*Example V*

To achieve a rapid polymer supersaturation, a polymer melt, in a pressure bomb, is subjected to 2000 p.s.i. of $CO_2$ for fifteen minutes, cooled, the bomb vented and the polymer foamed as previously indicated.

Now, having described my invention, I claim:

1. A process for foaming polymers comprising:
   exposing to a substantially inert gas, under pressure, a polymer having a low transmission rate for said inert gas for a period of time sufficient to supersaturate the polymer with the gas, thereafter
   reducing the pressure of the inert gas surrounding the polymer, and establishing at a temperature below the softening point of the polymer a pressure differential, between the internal and external pressures on the polymer, such that the internal pressure is sufficiently higher to cause the polymer to foam while it is in a solid state.

2. The process of claim 1 wherein the pressure differential is established by means of an external vacuum.

3. The process of claim 1 wherein heat is utilized to establish the pressure differential.

4. A process for the preparation of foamed polymers comprising dissolving a supersaturating amount of an inert gas in a substantially flexible shaped synthetic polymer at pressures of the inert gas of about 8 to in excess of 1000 atmospheres, said polymer having a low transmission rate for the inert gas, and adjusting the external gas pressure relative to the internal pressure of the gas in the polymer, at a temperature below the softening point of the polymer, and while said polymer is in a solid state, to establish a pressure differential between the internal and external pressures such that the internal pressure is sufficiently higher to cause foaming of the polymer by expansion of the gas within the polymer.

5. The process of claim 4 wherein the inert gas is selected from the group consisting of the noble gases, carbon dioxide, nitrogen, and polyhaloalkane gases.

6. The process of claim 4 wherein the polymers are selected from the group consisting of polycarbonates, polyesters, polyacrylonitrile and halo polymers.

7. The process of claim 4 wherein the gas is carbon dioxide and the polymer is a polyhalogenated polymer.

8. The process of claim 4 wherein the gas is carbon dioxide and the polymer is a polyacrylate.

9. The process of claim 4 wherein the gas is carbon dioxide and the polymer is a polycarbonate.

10. The process of claim 4 wherein the gas is carbon dioxide and the polymer is a polyformal.

11. The process of claim 4 wherein the gas is carbon dioxide and the polymer is a polyester.

12. The process of claim 4 wherein the gas is a polyhalogenated alkane and the polymer is a polyhalogenated polymer.

13. A process for foaming a synthetic flexible shaped solid polymer comprising the steps of:
    exposing said solid polymer to an inert gas under pressure at a temperature below the softening point of said solid polymer for a period of time sufficient to supersaturate the solid polymer, said polymer having a low transmission rate for said gas, and
    adjusting the external gas pressure relative to the internal pressure of the gas in the polymer at a temperature below the softening point of the polymer and while said polymer is in a solid state, to establish a pressure differential between the internal and external pressures such that the internal pressure is sufficiently higher to cause foaming of the polymer by expansion of the gas within the polymer.

(References on following page)

References Cited in the file of this patent

UNITED STATES PATENTS

| | | |
|---|---|---|
| 2,140,063 | Talalay | Dec. 13, 1938 |
| 2,194,036 | Talalay | Mar. 19, 1940 |
| 2,299,593 | Roberts et al. | Oct. 20, 1942 |
| 2,405,345 | Cooper et al. | Aug. 6, 1946 |
| 2,409,910 | Stober | Oct. 22, 1946 |
| 2,450,436 | McIntire | Oct. 5, 1948 |
| 2,576,977 | Stober | Dec. 4, 1951 |
| 2,666,036 | Schwencke | Jan. 12, 1954 |
| 3,026,272 | Rubens et al. | Mar. 20, 1962 |
| 3,026,273 | Engles | Mar. 20, 1962 |

UNITED STATES PATENT OFFICE
CERTIFICATE OF CORRECTION

Patent No. 3,140,266                          July 7, 1964

Warner L. Peticolas

It is hereby certified that error appears in the above numbered patent requiring correction and that the said Letters Patent should read as corrected below.

Column 4, line 7, after "foaming" insert -- substantially flexible shaped synthetic --; column 4, lines 20 and 22, for the claim reference numeral "1", each occurrence, read -- 4 --

Signed and sealed this 30th day of March 1965.

(SEAL)
Attest:

ERNEST W. SWIDER
Attesting Officer

EDWARD J. BRENNER
Commissioner of Patents